US012751447B2

(12) United States Patent
Garusi et al.

(10) Patent No.: US 12,751,447 B2
(45) Date of Patent: Oct. 6, 2026

(54) METHOD OF TREATING SURFACES

(71) Applicant: SANIPUR S.P.A., Flero (IT)

(72) Inventors: Gianfranco Garusi, Flero (IT); Francesco Garusi, Flero (IT); Beatrice Fermi, Flero (IT); Nicola Doniselli, Flero (IT)

(73) Assignee: SANIPUR S.P.A., Flero (IT)

( * ) Notice: Subject to any disclaimer, the term of this patent is extended or adjusted under 35 U.S.C. 154(b) by 595 days.

(21) Appl. No.: 18/147,643

(22) Filed: Dec. 28, 2022

(65) Prior Publication Data

US 2023/0200384 A1 Jun. 29, 2023

(30) Foreign Application Priority Data

Dec. 29, 2021 (EP) .................................... 21218115

(51) Int. Cl.

| | |
|---|---|
| ***A01N 25/30*** | (2006.01) |
| ***A01N 37/36*** | (2006.01) |
| ***A01N 59/00*** | (2006.01) |
| ***A01N 65/22*** | (2009.01) |
| ***A01N 65/28*** | (2009.01) |
| ***A01P 1/00*** | (2006.01) |

(52) U.S. Cl.

CPC ............. *A01N 25/30* (2013.01); *A01N 37/36* (2013.01); *A01N 59/00* (2013.01); *A01N 65/22* (2013.01); *A01N 65/28* (2013.01); *A01P 1/00* (2021.08)

(58) Field of Classification Search

CPC ........ A01N 25/30; A01N 37/36; A01N 59/00; A01N 65/22; A01N 65/28; A01P 1/00

See application file for complete search history.

(56) References Cited

U.S. PATENT DOCUMENTS

2008/0035580 A1 2/2008 de Rijk
2019/0075741 A1* 3/2019 Olesen .................. A01G 31/02
2021/0298301 A1* 9/2021 Lakaye ................. A01N 59/08
2021/0301191 A1 9/2021 Farmer et al.

FOREIGN PATENT DOCUMENTS

CN 111647470 A 9/2020
CN 111777201 A * 10/2020

OTHER PUBLICATIONS

CN 111777201 A, English translation provided by Google Patent / Translate (Year: 2025).*

W. He et al. "Isothiazolinones as Novel Candidate Insecticides for the Control of Hemipteran Insects," Antibiotics, 2021, 10, 436. (Year: 2021).*

Search Report for European Patent Application No. 121218115.0 (Jun. 22, 2022).

* cited by examiner

*Primary Examiner* — Michael P Cohen

(74) *Attorney, Agent, or Firm* — Merchant & Gould P.C.

(57) ABSTRACT

A method of treating at least one surface includes a step of contacting the at least one surface with an aqueous solution obtained by mixing in water an aqueous formulation having at least one biosurfactant and at least one organic acid. The weight ratio between the at least one biosurfactant and the at least one organic acid is between 1:1000 and 10:1, in an amount such that the aqueous solution includes the at least one biosurfactant in an amount between 0.0001 and 10% by weight and the at least one organic acid in an amount between 0.001 and 10% by weight. The at least one biosurfactant is selected from glycolipids, lipopeptides, lipoproteins, phospholipids and polymeric biosurfactants. The at least one organic acid is selected from citric acid, lactic acid, acetic acid, malic acid, maleic acid, formic acid, caprylic acid, methanesulfonic acid, tartaric acid, succinic acid, and polyaspartic acid.

12 Claims, 1 Drawing Sheet

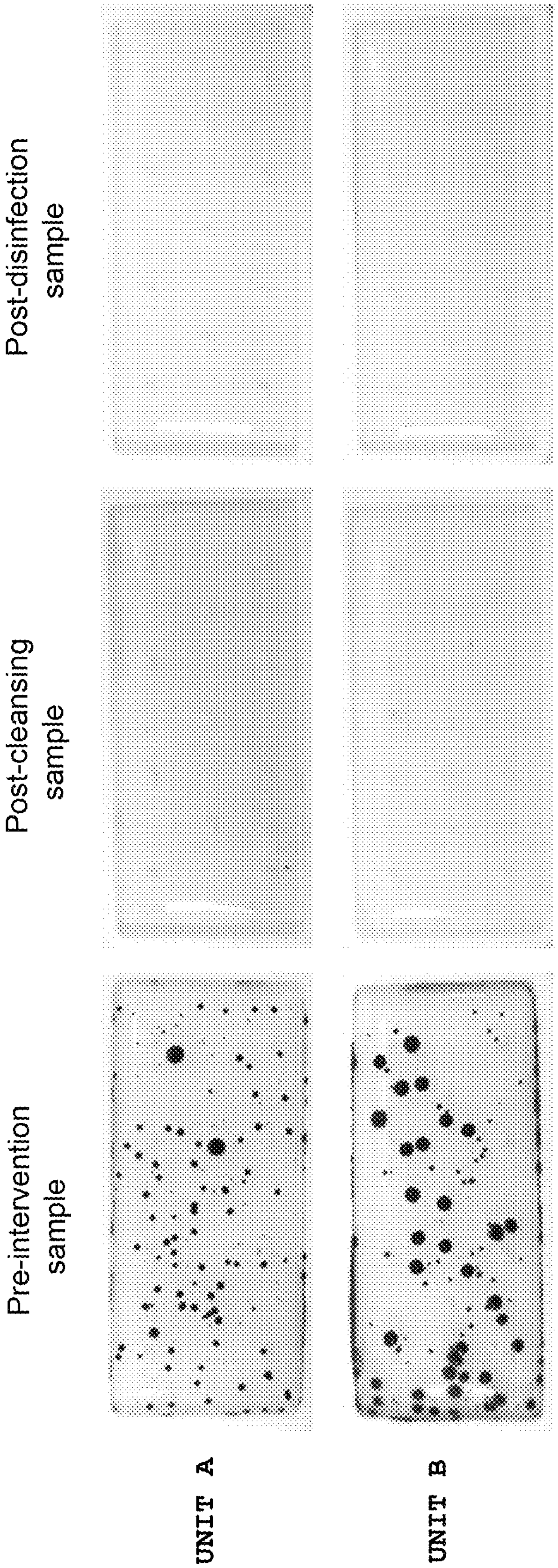
Post-disinfection sample
Post-cleansing sample
Pre-intervention sample
UNIT A
UNIT B

METHOD OF TREATING SURFACES

CROSS-REFERENCE TO RELATED APPLICATION

This application claims priority from European Patent Application No. 21218115.0 filed on Dec. 29, 2021, the disclosure of which is incorporated herein by reference in its entirety.

FIELD OF THE INVENTION

The present invention relates to a method of treating surfaces, in particular the internal surfaces of a plant or the surfaces of a product, with an aqueous solution comprising at least one biosurfactant and an organic acid. In particular, said method of treatment is aimed at removing the biofilm from said surfaces or preventing the formation thereof.

BACKGROUND ART

In order to increase their fitness and survivability, microorganisms such as fungi and bacteria have developed the ability to aggregate in more or less extensive communities protected by a self-produced polymeric extracellular matrix comprising polysaccharides, proteins, nucleic acids, and lipids. This polymeric matrix allows the microorganisms to remain associated with one another as well as to firmly adhere to the surface on which they are deposited, forming a film referred to as a biofilm.

The biofilm is the main form of life of microorganisms and contributes to the growth of the proliferative capacity of the latter on various types of surfaces including stainless steel, polyethylene, wood, glass, polypropylene, rubber.

The microorganisms are able to proliferate and form the biofilm by virtue of the presence of factors which favor the growth and adhesion thereof: one of them is the presence of water.

Since the biofilm generates where there is water, it is present in many environments and represents a threat especially in machinery and plants used in fields with strict sanitary-hygienic requirements, such as the agri-food, food & beverage, health, pharmaceutical, and cosmetics fields and the transport, supply and processing of drinking and mineral waters.

With reference to the agri-food field, the biofilm forms on the most varied surfaces, from field crops to irrigation systems, from agri-food products to plants for the processing and transformation of the latter. In fact, contaminations from microorganisms not only derive from the external environment (carried by insects or other animals, and deriving from the soil, air or agricultural practices such as natural fertilization), but also from the water used for irrigation and for washing the foods produced and the surfaces of the industrial plants in which the agri-food products are transformed.

The presence of proliferating microorganisms can have deleterious effects on crops, undermining the agricultural yields with apparent negative consequences for the entire supply chain. Furthermore, such contaminations can put human health at risk, especially in cases where agricultural products are used as food without previous cooking processes. In fact, some of the microorganisms which form or populate the biofilm are pathogenic to humans. *Pseudomonas, Staphylococcus, Enterobacter, Corynebacterium, Salmonella, Listeria* and some species of fungi, such as those belonging to the genera *Fusarium, Alternaria, Penicillium, Aspergillus*, are a clear example.

The removal of the biofilm, which is essential for ensuring an adequate hygienic condition of both the water and the surfaces with which it comes into contact, can be a complex operation. The polymeric matrix of which it is made acts as a protective shield against the action of most disinfectants, thus contributing to the microorganisms' survivability against commonly used disinfectants, as well as to the spread of adaptive resistance strategies against chemicals and antibiotics.

The biocides commonly used for disinfection are not only completely ineffective in removing the polymeric matrix which protects the microorganisms, but also struggle to penetrate it, reaching the layers where the proliferating microorganisms reside in sublethal concentrations, therefore insufficient for performing their disinfectant action.

Therefore, given its features, the biofilm represents a significant obstacle to an adequate disinfection.

Furthermore, the presence of inorganic deposits mainly of calcareous nature contributes to making the removal of the biofilm even more complex, thus also preventing an adequate disinfection.

The use of acidic or alkaline products commonly used in order to remove the biofilm can often be ineffective, even where it is possible to associate the chemical action with a mechanical rubbing effect on the surface to be treated. This is particularly critical for the internal surfaces of plants, which are often inaccessible and made of materials which are sensitive to the action of aggressive chemicals. In fact, the prolonged use of aggressive formulations can damage the surfaces and components of the plants, causing premature aging and compromising the quality of anything which comes into contact therewith, such as water.

This problem is also strongly felt in the healthcare field, with particular reference to medical-surgical instrumentation. In fact, ensuring an adequate control of bacterial and, more generally, microbiological proliferation on the surfaces and instruments used in medical and surgical practices represents an essential requirement also due to the socio-economic cost of the consequences deriving from infections acquired in the healthcare environment and the progressive spread of resistance mechanisms to antibiotics and biocides.

Therefore, the problem underlying the present invention is to provide a method of treatment which allows ensuring an adequate removal of the biofilm, or even preventing the formation thereof, thus making the disinfection procedures more effective and contributing to the reduction of the amounts of biocides needed to achieve an appropriate standard of hygiene.

At the same time, the present invention aims to provide a sustainable method of treatment which uses products compatible with the materials of the surfaces to be treated and with low environmental impact, both in the production phase and during use, meeting the growing needs of biodegradability and eco-compatibility.

SUMMARY OF THE INVENTION

The above problem is solved by a method of treating at least one surface, as outlined in the appended claims, the definitions of which form an integral part of the present disclosure.

An object of the present invention is a method of treating at least one surface, comprising a step in which said at least one surface is contacted with an aqueous solution obtained by mixing in water an aqueous formulation comprising at least one biosurfactant and at least one organic acid, wherein the weight ratio between said at least one biosurfactant and said at least one organic acid is between 1:1000 and 10:1, in an amount such that said aqueous solution comprises said at least one biosurfactant in an amount between 0.0001 and 10% by weight and said at least one organic acid in an amount between 0.001 and 10% by weight, said at least one biosurfactant being selected from glycolipids, lipopeptides, lipoproteins, phospholipids and polymeric biosurfactants, preferably from the group consisting of sophorolipids, rhamnolipids, trehalolipids, cellobiose lipids, surfactin, viscosin, lichenysin, iturin, fengycin, emulsan, biodispersan, alasan, liposan, said at least one organic acid being selected from citric acid, lactic acid, acetic acid, malic acid, maleic acid, formic acid, caprylic acid, methanesulfonic acid, tartaric acid, succinic acid, and polyaspartic acid.

In the method of treatment of the present invention, said at least one surface is treated with said aqueous solution, preferably said aqueous solution is made to flow in contact with said at least one surface.

Advantageously, during the step of the aforesaid method in which the surface is contacted with said aqueous solution, the biofilm and inorganic deposits are removed from the surface, or the formation thereof is prevented. Advantageously, said step is a cleansing step.

According to an embodiment of the invention, said method of treatment may comprise a step of disinfection of said at least one surface after the step in which said surface is contacted with said aqueous solution. Said disinfection step comprises mixing in water a disinfectant agent in an amount such as to obtain an aqueous disinfectant solution comprising said disinfectant agent in an amount between 0.001 and 1.5% by weight, preferably said disinfectant agent comprising between 0.01 and 1% by weight of hydrogen peroxide and/or between 0.001 and 0.5% by weight of peracetic acid. During said disinfection step, the surface is contacted with said aqueous disinfectant solution, preferably said aqueous disinfectant solution is made to flow in contact with said at least one surface.

In an embodiment of the present invention, said at least one surface is the internal surface of a plant fed with water from a water distribution system. According to this embodiment, the method of treatment comprises a step (so-called cleansing step) of prevention of the formation of biofilm on said internal surface or of disintegration of the biofilm present on said internal surface, wherein said cleansing step comprises circulating inside the plant, in contact with said at least one surface, said aqueous solution.

According to a second embodiment of the present invention, said at least one surface is the surface of a product, in particular of a product intended for consumption or use. According to this embodiment, the method of treatment comprises a step (so-called cleansing step) of prevention of the formation of biofilm or of disintegration of the biofilm present on said at least one surface, wherein said cleansing step comprises contacting said at least one surface with said solution.

The method of treatment according to the present invention allows breaking up and removing the biofilm, as well as preventing the formation thereof where possible, thus making the eradication of pathogens and, in general, of potentially harmful microorganisms easier and more effective, without causing damage to the environment but using environmentally-friendly and biodegradable formulations. Furthermore, the method of treatment of the present invention ensures an effective disinfection procedure of plants and products for which it is necessary to ensure a high standard of hygiene.

Further features and advantages of the invention will become more apparent from the description of some embodiments thereof, given hereinbelow by way of non-limiting example.

BRIEF DESCRIPTION OF THE DRAWINGS

FIG. 1 shows some photographs of the microbiological controls (dipslides) resulting from the analysis of the bacterial count of the water circulating in the water circuit of two dental units before and after having carried out the sanitizing method according to an embodiment of the present invention.

DETAILED DESCRIPTION OF THE INVENTION

An object of the present invention is a method of treating the surfaces of plants and products subject to the formation of biofilm, which allows achieving high disinfection standards and meeting the biocompatibility, eco-compatibility, biodegradability and sustainability needs which are currently becoming more and more urgent.

It has surprisingly been found that the aqueous solution used in the method of treatment of the present invention ensures a disintegrating action on the polymeric matrix forming the biofilm, by degrading the biofilm itself, until it detaches from the surfaces on which it is deposited. Said aqueous solution simultaneously allows the dissolution of inorganic deposits of a mainly calcareous nature which contribute to the refractoriness of the biofilm towards the systems commonly adopted for the removal thereof.

It has surprisingly been found that by diluting (namely, dosing, or mixing in an appropriate amount) an aqueous formulation comprising at least one biosurfactant and at least one organic acid directly in the water circulating inside a plant, or in the washing water of a product, the formation of biofilm on the respective surfaces is prevented, or the biofilm already formed is removed, ensuring an effective sanitization and disinfection procedure, the latter not only due to the disintegration of the polymeric matrix which allows per se significantly reducing the concentration of disinfectant products required during the disinfection step, but also due to an intrinsic disinfectant action of the formulation itself.

As already mentioned above, the aqueous formulation which is mixed in water in an amount such as to form the aqueous solution used in the method of the present invention comprises at least one biosurfactant selected from glycolipids, lipopeptides, lipoproteins, phospholipids and polymeric biosurfactants, and at least one organic acid selected from citric acid, lactic acid, acetic acid, malic acid, maleic acid, formic acid, caprylic acid, methanesulfonic acid, tartaric acid, succinic acid, and polyaspartic acid.

In the present application, the phrases "mixing the formulation in water in an amount such as to" and "dosing the formulation in water in such a way as to" will be used interchangeably.

Biosurfactants are surfactants of microbial origin, which are secreted into the extracellular environment, or are produced intracellularly, or derive from cell membrane portions of bacteria and fungi. They can derive from the use of various types of substrate such as sugars, oils, alkanes or raw materials which represent the waste of other processing, through microbial fermentation processes. The fact that said surfactants can derive from the processing of waste products of many industrial chains (for example the agri-food one) is part of the increasingly current perspective of creating a sustainable development model based on the minimization of waste production, in which wastes deriving from industrial processing can be reused and valorized rather than disposed of, according to the principles of circular economy.

In the following description the terms "surfactant of microbial origin" and "biosurfactant" will be used interchangeably.

Preferably, said biosurfactant is selected from the group consisting of sophorolipids, rhamnolipids, trehalolipids, cellobiose lipids, surfactin, viscosin, lichenysin, iturin, fengycin, emulsan, biodispersan, alasan, liposan.

Preferably, said biosurfactant is selected from sophorolipids isolated from different species of *Candida*, and rhamnolipids produced by bacteria such as those belonging to the genus *Pseudomonas*.

Said aqueous formulation comprises said at least one biosurfactant and said at least one organic acid in a weight ratio between 1:1000 and 10:1, such as for example between 1:100 and 1:1 or between 1:10 and 1:1, for example 1:2.

According to an embodiment, said aqueous formulation further comprises at least one synthesis surfactant of anionic, cationic, amphoteric, or non-ionic nature, preferably deriving from a renewable source, for example coconut oil and palm kernel oil. Preferably, the weight ratio between said at least one biosurfactant and said at least one synthesis surfactant is between 1:1 and 1:0.01, for example between 1:1 and 1:0.1.

Said anionic surfactants include, for example, paraffins and alkylbenzene sulfonates, alkyl sulfates, alkyl ether sulfates, alkyl ether carboxylates, alkyl ester sulfonates, soaps, amino acid derivatives. Specific examples of anionic surfactants include methyl ester sulfonate and Sodium Coco Sulfate.

Said non-ionic surfactants include, for example, ethoxylated fatty alcohols, ethoxylated-propoxylated fatty alcohols, ethoxylated fatty acids, ethoxylated alkylphenols, ethoxylated fatty amines, ethoxylated alkylamides, alkyl polyglucosides.

Said amphoteric surfactants include, for example, alkyl betaines, alkyl amidopropyl betaines, alkylglycines.

Said cationic surfactants include, for example, alkyl ammonium methosulfates and esterquats.

According to an embodiment, said aqueous formulation further comprises at least one enzyme which is active at acidic or neutral pH. Preferably, the weight ratio between said at least one biosurfactant and said at least one enzyme is between 1:0.0001 and 1:0.1, for example between 1:0.001 and 1:0.01.

Preferably, said at least one enzyme is selected from the group consisting of specific enzymes for the degradation of polysaccharides, specific enzymes for the degradation of proteins, lipases, nucleases, and enzymes adapted to catalyze redox reactions. For example, said at least one enzyme is selected from lysozyme, α-amylase, dispersin B, alginate lyase, subtilisin, proteinase K, metalloprotease, cysteine protease, deoxyribonuclease I, RNase H.

Said aqueous formulation can further comprise at least one non-oxidizing disinfectant agent, for example selected from quaternary ammonium salts, alcohols and biguanide compounds. Preferably, the weight ratio between said at least one biosurfactant and said at least one non-oxidizing disinfectant agent is between 1:0.0001 and 1:0.1, for example between 1:0.001 and 1:0.01.

Said formulation can further contain at least one essential oil and/or plant extract (vegetable extract) which, in addition to improving the organoleptic qualities of said formulation, can contribute to the removal of the biofilm and to the disinfectant action. By way of mere example, essential oil of eucalyptus, mint, thyme, coriander, oregano, litsea are mentioned. Preferably, the weight ratio between said at least one biosurfactant and said at least one essential oil and/or plant extract is between 1:0.0001 and 1:0.01.

Said aqueous formulation can further comprise at least one chelating agent, preferably biodegradable, bio-based, obtained from renewable sources, selected for example from glutamic N,N-diacetic acid (GLDA) and salts thereof, chitosan, methylglycine N,N-diacetic acid (MGDA) and salts thereof, ethylenediamine-N,N-disuccinic acid (EDDS), polyaspartic acid and salts thereof, gluconic acid and salts thereof. Preferably, the weight ratio between said at least one biosurfactant and said at least one chelating agent is between 1:0.0001 and 1:0.1.

According to some embodiments, the aqueous formulation does not comprise synthesis surfactants, and/or does not comprise enzymes which are active at acidic or neutral pH, and/or does not comprise non-oxidizing disinfectant agents, and/or does not comprise essential oils or plant extracts, and/or does not comprise chelating agents.

According to an embodiment, the aqueous formulation consists of said at least one biosurfactant, said at least one organic acid, and optionally one or more of: said at least one synthesis surfactant, said at least one enzyme which is active at acidic or neutral pH, said at least one non-oxidizing disinfectant agent, said at least one essential oil or plant extract, said at least one chelating agent.

The aqueous formulation as described above forms a further object of the present invention, regardless of the method of treatment in which it is used.

The concentrations of biosurfactants, organic acids, synthesis surfactants, enzymes, non-oxidizing disinfectant agents, essential oils, plant extracts and chelating agents in the formulation are very variable according to the use thereof in the different embodiments of the method of treatment according to the present invention. Some examples of formulations will be cited in the following description in association with the method of treatment in which they are used.

Method for Treating the Internal Surfaces of a Plant

According to an embodiment, the method of treatment of the invention is a method for treating the internal surfaces of a plant. Advantageously, said method of treatment is a method of on-site sanitization of the internal surfaces of a plant. In the present application, reference will be made to said, "method for treating the internal surfaces of a plant" also as a "method of on-site sanitization of the internal surfaces of a plant".

Said plant is fed with water coming from an appropriate water distribution system to which it is connected, as will be defined below. Advantageously, said plant is an open system, in which water coming from said distribution system flows through the plant and then flows out from the plant itself, without recirculating inside it. Preferably, the water exiting from said plant is intended for consumption or use.

According to this embodiment, said method comprises a cleansing step intended to prevent the formation of biofilm on said internal surfaces or to disintegrate the biofilm if already present on said internal surfaces.

Said method, more in particular said cleansing step, comprises dosing in water, more in particular in the feed water of the plant, the aforesaid aqueous formulation so that an aqueous solution circulates inside said plant which comprises:

said at least one biosurfactant in an amount between 0.0001 and 10% by weight, said at least one organic acid in an amount between 0.001 and 10% by weight, optionally said at least one synthesis surfactant in an amount between 0.001 and 10% by weight, optionally said at least one enzyme in an amount between 0.00001 and 2% by weight, optionally said at least one non-oxidizing disinfectant agent in an amount between 0.0001 and 1% by weight, optionally said at least one essential oil or plant extract in an amount between 0.001 and 0.1% by weight, and optionally said at least one chelating agent in an amount between 0.0001 and 0.1% by weight.

During said cleansing step, the aforesaid aqueous solution is circulated inside the plant, in contact with said surfaces. In other words, said cleansing step comprises mixing (i.e., dosing) the aforesaid aqueous formulation in water in an amount such as to form the aforesaid aqueous solution, and contacting the internal surfaces of the plant with said aqueous solution, in particular flowing said aqueous solution in contact with the internal surfaces of the plant.

According to a first embodiment, said method, more in particular said cleansing step, is carried out continuously, and the aqueous solution circulating inside the plant comprises:

said at least one biosurfactant in an amount preferably between 0.0001 and 0.5% by weight, more preferably between 0.001 and 0.1% by weight, said at least one organic acid in an amount preferably between 0.001 and 1% by weight, more preferably between 0.01 and 0.1% by weight, optionally said at least one synthesis surfactant in an amount preferably between 0.001 and 0.1% by weight, optionally said at least one non-oxidizing disinfectant agent in an amount preferably between 0.0001 and 0.1% by weight, more preferably between 0.001 and 0.05% by weight, and optionally said at least one essential oil or plant extract in an amount between 0.001 and 0.1% by weight.

According to this embodiment in which the method, more in particular the cleansing step, is carried out continuously, preferably the aqueous solution circulating in the plant does not contain enzymes. According to this embodiment, preferably the aqueous solution circulating in the plant does not contain chelating agents.

According to an alternative embodiment, said method, more in particular said cleansing step, is carried out in a discontinuous manner, to be understood as a shock treatment. The phrase "discontinuous manner" denotes a discontinuous-type dosage mode of the formulation in water. According to this embodiment, said aqueous solution circulating inside the plant comprises:

said at least one biosurfactant in an amount preferably between 0.1 and 10% by weight, more preferably between 0.5 and 2% by weight, said at least one organic acid in an amount preferably between 0.01 and 10% by weight, more preferably between 0.1 and 10% by weight or between 0.5% and 2% by weight, optionally said at least one synthesis surfactant in an amount preferably between 0.01 and 10% by weight, more preferably between 0.1 and 1% by weight, optionally said at least one enzyme in an amount between 0.00001 and 2% by weight, preferably between 0.001 and 1% by weight, optionally said at least one non-oxidizing disinfectant agent in an amount preferably between 0.01 and 1% by weight, optionally said at least one essential oil or plant extract in an amount between 0.001 and 0.1% by weight, and optionally said at least one chelating agent in an amount between 0.0001 and 0.1% by weight.

The "shock treatment", also known as "impact treatment", is a treatment carried out in response to specific needs or on a periodic basis. In other words, the "shock treatment" is not carried out continuously during the entire operation/functioning period of the plant as a preventive action, but can be carried out, for corrective purposes if microbiological non-conformities have been detected, or with preventive purpose at specific times, for example before the stopping or shutdown of the plant, or before the start-up or commissioning thereof, or at predetermined time intervals. In contrast, the "continuous treatment" is carried out continuously during the entire operation/functioning period of the plant, without interruptions.

If the formulation dosed in the sanitizing method and, therefore, the resulting aqueous solution comprise a disinfectant agent in the aforesaid amounts, a disinfection operation is also carried out simultaneously with the step of cleansing the plant surfaces.

According to a specific embodiment, where necessary, said method of on-site sanitization of the internal surfaces of a plant further comprises a disinfection step after the aforesaid cleansing step. For example, said disinfection step can be carried out in the case where the aqueous formulation does not contain a disinfectant agent.

Preferably, said subsequent disinfection step comprises mixing (i.e., dosing) at least one disinfectant agent in water so that during said disinfection step an aqueous disinfectant solution comprising said disinfectant agent in an amount between 0.001 and 1.5% by weight circulates within the plant. The disinfectant agent used in said step can be either an oxidizing disinfectant agent, preferably selected from hydrogen peroxide and organic peroxides and derivatives thereof, for example peracetic acid, or a non-oxidizing disinfectant agent, for example selected from those listed above.

Preferably, an oxidizing disinfectant agent is used during said subsequent disinfection step. Preferably, said disinfectant agent is hydrogen peroxide or peracetic acid or a mixture thereof. Preferably, hydrogen peroxide is present in the aqueous disinfectant solution in an amount between 0.01 and 1% by weight. Preferably, peracetic acid is present in the aqueous disinfectant solution in an amount between 0.001 and 0.5% by weight. Such a disinfection step is necessary, for example, when the achievement of a high disinfection condition is required.

According to an embodiment, said method of on-site sanitization of the internal surfaces of a plant is a continuous treatment and comprises only the cleansing step as defined above; simultaneously with said cleansing step, a disinfection operation can also occur if the aqueous solution contains a non-oxidizing disinfectant agent as well.

According to another embodiment, said method of on-site sanitization of the internal surfaces of a plant is a continuous treatment and comprises a sequence of cleansing steps alternating with separate disinfection steps, said cleansing and disinfection steps being as defined above.

In the following description, for convenience of reference, the term "aqueous solution" will refer both to the aqueous solution circulating in the plant during the cleansing step and to the aqueous disinfectant solution circulating in the plant during the possible subsequent disinfection step, unless otherwise specified.

In the following description, the embodiments related to the specific place or point in which the aforesaid aqueous formulation is dosed in the water feeding the plant also refer to the dosage of disinfectant agent in the possible subsequent disinfection step, unless otherwise specified.

Advantageously, the aqueous solution is circulated in an internal water circuit of said plant. Said internal water circuit comprises for example pipes and/or capillaries, valves, containers, filtration systems, dispensing systems (e.g., nozzles) and associated fittings.

The method according to the invention is particularly suitable for sanitizing the internal surfaces of the parts of the plant which are most susceptible to the formation of biofilms due to the structural and functional features thereof. Such features include, for example, reduced diameters of the pipes or other parts of the plant, reduced flow of water or other fluids circulating in the plant, intermittent operation which determines periods of stagnation of the water or other fluids. As a result, such a method is particularly suitable for application in plants provided with capillaries or pipes with reduced lumen, inside which the aforesaid aqueous solution is circulated.

Preferably, said sanitizing method is applied to plants belonging to the field of the transport, supply and processing of drinking or mineral water, to the agri-food field, for example irrigation systems or plants for the processing and transformation of agricultural and agri-food products, to the healthcare, pharmaceutical, cosmetic and food & beverage fields.

Said sanitization method can be used for the so-called "Clean In Place" (CIP) processes, which allow cleaning the plants on site without moving or disassembling the parts to be cleaned.

According to different embodiments, the water distribution system which feeds said plant includes an aqueduct distribution network or a well or a water source or a water storage tank. Said water distribution system further includes one or more pipes intended to feed the plant with the water from said aqueduct distribution network or said well or said source or said tank. The term "source" denotes the area of the earth's surface from which an appreciable flow of water emerges naturally from the aquifer.

According to a first embodiment, the water feeding said plant comes from an aqueduct distribution network or a well or a source. According to this embodiment, the pipe exiting the well, or the pipe from the source, or the main line of the aqueduct distribution network, preferably branches off giving rise to a plurality of pipes, which can in turn branch off giving rise to further pipes, obtaining a more or less dense network of pipes. In other words, the main pipe can branch into primary pipes, which can in turn branch into secondary pipes, and so on. Preferably, at least one of said pipes is intended to selectively feed the plant subjected to the sanitizing method according to the invention.

Advantageously, the aforesaid aqueous formulation is dosed in a conveniently chosen point of the water distribution system, based on the specific structural features thereof, in order to advantageously ensure a rapid and uniform distribution of the formulation in the internal water circuit of the plant. Preferably, said dosing point is positioned upstream of the internal water circuit of the plant, namely in said at least one pipe which selectively feeds the plant (i.e., the internal water circuit thereof) subjected to the sanitizing method of the invention. Preferably, said dosing point is positioned at the beginning of said at least one pipe, i.e., substantially near the point where the latter detaches from the pipe from which it originates to selectively feed the plant.

According to this embodiment, an injection point is obtained inside said at least one pipe, through which the aforesaid formulation or only the disinfectant agent is dosed (depending on whether it is the cleansing step or the subsequent and possible disinfection step) in the water feeding the plant in order to obtain an aqueous solution as defined above. Preferably, said formulation (or disinfectant agent) is dosed using a dosing pump or a liquid mover, depending on the volume to be dosed.

According to a second embodiment, the water feeding said plant comes from a water storage tank or reservoir or cistern. The terms tank, reservoir and cistern are used interchangeably in the following description. Preferably, one or more pipes branch off from said tank, at least one of which being intended to selectively feed the plant.

In an embodiment, said formulation (or disinfectant agent) is dosed into said at least one pipe exiting the tank intended to selectively feed the plant, preferably at the beginning of said at least one pipe, i.e., substantially close to the point where said pipe exits the tank. In this embodiment, the formulation (or disinfectant agent) is preferably dosed using a dosing pump or a liquid mover.

In another embodiment, said formulation (or disinfectant agent) is dosed directly inside the tank.

In the following description, some examples of plants subjected to the sanitizing method of the invention are described by way of non-limiting example, which comprises said cleansing step and possibly a subsequent disinfection step as described above.

1) Water Distribution Plant for an End Use

In an embodiment of the invention, said plant is a water distribution plant for an end consumption or end use and said formulation is dosed in the water intended for said end consumption or end use.

For example, said plant is a field irrigation system, preferably irrigation by sprinkling, drip irrigation or sub-irrigation, or a vertical cultivation or hydroponic cultivation system.

Preferably, the water feeding said plant comes from a well or a water storage tank or the aqueduct distribution network. The specific dosing point of the formulation in water is as defined above with reference to said water distribution systems, preferably at the beginning of said at least one pipe intended to selectively feed the plant. Preferably, the dosage of the formulation occurs by means of a dosing pump.

Said dosage can be proportional to the flow rate of water feeding the plant, or it can be defined based on specific parameters monitored by means of probes or other suitable analytical methods, for example pH, redox potential, conductivity, TOC or ATP, or it can be temporally controlled by using special timers.

The sanitizing method according to this embodiment can be either a continuous treatment or a shock treatment. The cleansing step can be carried out both for corrective purposes to eliminate the pre-existing biofilm and for preventive purposes to prevent the formation of biofilm.

Preferably, said sanitizing method is a continuous treatment. Said continuous sanitizing method can comprise only the cleansing step, simultaneously with which a disinfection operation can also occur if the aqueous solution further contains a non-oxidizing disinfectant agent, or it can comprise a sequence of cleansing steps alternating with separate disinfection steps, in accordance with the description above.

The aqueous formulation is advantageously dosed in the water intended for irrigation or fertigation of the crops. The aqueous solution circulating in the plant advantageously removes the biofilm present in the internal water circuit of the plant and prevents the subsequent formation thereof, preventing the obstruction of pipes and nozzles and hindering microbial proliferation which is harmful to crops and dangerous to human health.

In addition to ensuring the healthiness of the water, which often results as the main vehicle of microbial contamination of agricultural production in all its forms, the aqueous formulation further advantageously exerts a protective action towards the crops, counteracting the formation of biofilms on the surfaces thereof and the proliferation of microbial species which can significantly reduce yields and the quality of the agricultural products.

Two so-called "stock" formulations are mentioned by way of mere example, which are conveniently dosed in the water feeding a hydroponic cultivation plant so that an aqueous solution in accordance with the above description circulates therein, preferably during a continuous treatment.

A first stock formulation for use in fresh water (up to 20° f) comprises:

| | |
|---|---|
| 20% | sophorolipids, and |
| 20% | citric acid |

A second stock formulation for use in hard water (from 20 to 40° f) comprises:

| | |
|---|---|
| 20% | sophorolipids, and |
| 40% | citric acid. |

Preferably, both of the aforesaid formulations are dosed in the water feeding the plant so as to obtain a 1:2000 dilution thereof.

2) Water Circuit of Dental Units

According to an embodiment, said plant is a water circuit of dental units. Said water circuit preferably comprises a plurality of tubes of reduced diameter and/or capillary tubes.

The water feeding the water circuit of the dental unit preferably comes from a tank or an internal water distribution network inside the building where the unit is located.

The sanitizing method according to this embodiment can be either a continuous treatment or a shock treatment. In particular, when the sanitizing method is a shock treatment, the corresponding cleansing step (as well as the possible subsequent disinfection step) is carried out discontinuously according to a frequency to be defined based on the specific features of the dental unit and based on how it is used, for example at least monthly, preferably every 15 days or weekly.

Based on the type of treatment (continuous or shock), the mode with which the formulation is dosed varies so that an aqueous solution as defined above circulates in the water circuit of the dental unit.

In the embodiment where the sanitizing method is a shock treatment, the water feeding the water circuit of the dental unit preferably comes from a tank and the formulation is preferably dosed into the tank itself; by flushing the resulting aqueous solution, the arrival of said solution is ensured to all points of use, i.e., to all the outlets of the dental unit. According to this embodiment, the unit is preferably temporarily disconnected from the internal water distribution network inside the building. Said shock treatment is carried out according to a periodicity defined based on the features of the dental unit, for example at the end of a working day.

In the embodiment where the sanitizing method is a continuous treatment, the water feeding the water circuit of the dental unit preferably comes from the internal water distribution network inside the building and the formulation is preferably dosed into the pipe which selectively feeds the dental unit, preferably with the aid of a liquid mover or with a dosing system based on the use of dosing pumps. Preferably, the formulation is dosed at the beginning of said pipe, i.e., substantially near the point where the latter detaches from the pipe from which it originates to selectively feed the unit, for example from the main pipe of the internal water distribution network inside the building. Preferably, an antibacterial filter is present between the internal water distribution network inside the building and said pipe which selectively feeds the dental unit, and said formulation is dosed immediately downstream of said filter. Preferably, the handpieces, cup and fountain of the dental unit are flushed until the presence of the aqueous solution is proven at each of the outlets.

The method according to the present invention has proved to be very advantageous for sanitizing the water circuits of dental units, which are particularly subject to the formation of biofilms due to the reduced lumen of the tubes and/or capillaries, the reduced water flow and the discontinuous use.

Furthermore, the contact with the mucous membranes and saliva of patients makes such units particularly prone to retro-contamination phenomena. The extreme sensitivity of the materials of which some components of these plants are made (for example, brass solenoid valves) leads to problems of incompatibility with the most commonly used chemical agents for the sanitization thereof, resulting in problems of corrosion and reduction of the shelf-life thereof. In contrast, it has surprisingly been found that the formulation of the invention is compatible with all the materials forming these plants.

Two so-called "stock" formulations are mentioned by way of mere example, which are conveniently dosed so that an aqueous solution in accordance with the above description circulates in the water circuit of a dental unit, preferably during a periodic shock treatment (for example weekly).

A first stock formulation for use in fresh water (up to 20° f) comprises:

| | |
|---|---|
| 10% | sophorolipids; |
| 2% | citric acid; |
| 0.5% | sodium coco sulfate; |
| 0.03% | mint essential oil. |

A second stock formulation for use in hard water (from 20 to 40° f) comprises:

| | |
|---|---|
| 10% | sophorolipids; |
| 10% | citric acid; |
| 0.5% | sodium coco sulfate; |
| 0.03% | mint essential oil. |

Preferably, both of the aforesaid formulations are to be diluted 10 times in water before use, for example inside a tank.

3) Drinking or Mineral Water Supply System

According to an embodiment, said plant is a public or private system for the supply of drinking water (for example, so-called water houses) or mineral water.

Advantageously, the sanitizing method according to this embodiment is a shock treatment and the corresponding cleansing step (as well as the possible subsequent disinfection step) can be carried out discontinuously according to a predetermined frequency, for example weekly, monthly or bimonthly, or for corrective purposes in case of detection of microbiological non-compliance.

Preferably, the water feeding said plant comes from the aqueduct distribution network, or a source, or a tank. The specific dosing point of the formulation in water is as defined above with reference to said water distribution systems, preferably at the beginning of said at least one pipe intended to selectively feed the plant concerned. Preferably, the dosage of the formulation occurs with the aid of a liquid mover or a dosing pump.

The method according to the present invention has proved to be highly effective in removing the biofilm and ensuring adequate hygienic conditions of the internal surfaces of the pipes of the drinking or mineral water supply system and, ultimately, of the supplied water, avoiding interruptions of the supply service and safeguarding the health of end users.

Said drinking or mineral water supply systems are also characterized by the presence of pipes with reduced lumen and by a discontinuous operation which determines long periods of stagnation of the water therein. They are also subject to retro-contamination phenomena caused by the manipulation of the dispensers by users. It follows that even said drinking or mineral water supply systems are highly subject to the formation of biofilm, this being the reason of frequent and recurring microbial contamination which can cause non-compliance with drinking water parameters, which in turn results in the service interruption.

4) Liquid Product Processing and Packaging Plant

According to an embodiment, said plant is a plant for processing and packaging (or bottling) liquid products, in particular in the food & beverage, cosmetic and personal care fields.

According to this embodiment, the sanitizing method is a shock treatment for the so-called "Clean In Place" (CIP) procedure, already mentioned above.

During the step of washing of the plant, the latter is fed with water from a well or the aqueduct distribution network or a water storage tank. The specific dosage point of the formulation in water is as defined above with reference to said water distribution systems.

If the water comes from a well or the aqueduct distribution network, the formulation is preferably dosed at the beginning of the pipe which selectively feeds the plant, preferably with the aid of a dosing pump, preferably in proportion to the water flow rate.

If the water comes from a storage tank, the formulation is dosed in the tank itself proportionally to the volume of water contained therein, or in the pipe exiting said tank intended to feed the plant proportionally to the flow rate of water exiting the tank itself.

Preferably, the aqueous solution obtained by dosing the above formulation in water is made to flow in the plant, is recirculated inside it if the circuit is semi-closed, and is flushed from nozzles and taps.

If necessary, the cleansing step is followed by a disinfection step in accordance with the description above.

A so-called "stock" formulation is mentioned by way of mere example, which is conveniently dosed so that an aqueous solution in accordance with the above description circulates in said liquid product processing and packaging plant.

Such a stock formulation comprises:

| | |
|---|---|
| 20% | sophorolipids |
| 10% | rhamnolipids |
| 40% | citric acid |
| 4% | N,N-dimethyl 9-decenamide |
| 4% | of an enzymatic mixture comprising protease, α-amylase, lipase. |

Preferably, said formulation is dosed in the water feeding the plant so as to obtain a 1:40 dilution thereof.

Method for Treating the Surfaces of a Product

According to an embodiment, the method of treatment of the invention is a method for treating the surfaces of a product, preferably of a product intended for consumption or use. Advantageously, said method of treatment is a sanitization method of the surfaces of said product. In the present application, reference will be made to said "method for treating the surfaces of a product" also as a "sanitization method of the surfaces of a product".

In particular, said product is a product the surfaces of which are subject to biofilm formation.

According to this embodiment, said method comprises a cleansing step adapted to prevent the formation of biofilms or to disintegrate the biofilm if already present on the surface of said product.

Said method, more in particular said cleansing step, comprises contacting the surfaces of said product with an aqueous solution obtained by dosing the aforesaid aqueous formulation in water so that said aqueous solution comprises:

- said at least one biosurfactant in an amount between 0.0001 and 10% by weight,
- said at least one organic acid in an amount between 0.001 and 10% by weight,
- optionally said at least one synthesis surfactant in an amount between 0.001 and 10% by weight,
- optionally said at least one enzyme in an amount between 0.00001 and 2% by weight,
- optionally said at least one non-oxidizing disinfectant agent in an amount between 0.0001 and 1% by weight,
- optionally said at least one essential oil or plant extract in an amount between 0.001 and 0.1% by weight, and
- optionally said at least one chelating agent in an amount between 0.0001 and 0.1% by weight.

Said cleansing step comprises mixing (i.e., dosing) the aforesaid aqueous formulation in water in an amount such as to form the aforesaid aqueous solution, and contacting the surfaces of said product with said aqueous solution, for example flowing said aqueous solution in contact with the surfaces of said product. Preferably, said cleansing step comprises washing the surfaces of the product with said aqueous solution.

If the formulation which is dosed in the aforesaid sanitization method and, therefore, the resulting aqueous solution comprise a disinfectant agent in the amounts defined above, an operation of disinfection of the product is carried out simultaneously with the cleansing step of the product.

According to a specific embodiment, the formulation dosed in the sanitization method and the resulting aqueous solution do not contain a disinfectant agent.

According to a specific embodiment, if necessary, said sanitization method further comprises a disinfection step following the aforesaid cleansing step. For example, said subsequent disinfection step can be carried out in the case where the aqueous formulation does not contain a disinfectant agent. Preferably, said subsequent disinfection step comprises dosing at least one disinfectant agent in water so that during said disinfection step an aqueous disinfectant solution comprising said disinfectant agent in an amount between 0.001 and 1.5% by weight contacts the product surfaces, or is made to flow in contact with them. The disinfectant agent used in said step can be either an oxidizing disinfectant agent, preferably selected from hydrogen peroxide and organic peroxides and derivatives thereof, for example peracetic acid, or a non-oxidizing disinfectant agent, for example selected from those listed above.

Preferably, an oxidizing disinfectant agent is used during said subsequent disinfection step. Preferably, said disinfectant agent is hydrogen peroxide or peracetic acid or a mixture thereof. Preferably, hydrogen peroxide is present in said aqueous disinfectant solution in an amount between 0.01 and 1% by weight. Preferably, peracetic acid is present in said aqueous disinfectant solution in an amount between 0.001 and 0.5% by weight. Such a disinfection step is necessary, for example, when the achievement of a high disinfection condition is required.

In the following description, for convenience of reference, the term "aqueous solution" will refer both to the aqueous solution used during the cleansing step and to the aqueous disinfectant solution used during the possible subsequent disinfection step, unless otherwise specified.

In the following description, the embodiments related to the specific place or point at which the aforesaid aqueous formulation is dosed in water, in particular in the washing water of the product, also refer to the dosage of disinfectant agent in the possible subsequent disinfection step, unless otherwise specified.

According to a first embodiment, said method is carried out inside a reservoir containing said aqueous solution. According to different embodiments, the aforesaid aqueous formulation is dosed in the water feeding said reservoir or directly in the water contained in said reservoir, thus obtaining the aforesaid aqueous solution. According to these embodiments, said formulation can therefore be injected into the water supply pipe to said reservoir, or directly into the reservoir.

According to an embodiment, the water contained in said reservoir is continuously recycled and is periodically replaced. In an embodiment, the water recirculating in the reservoir is completely replaced with fresh water once the washing of one or more products is finished. In another embodiment, the water recirculating in the reservoir is partially replaced with fresh water and the aqueous formulation is continuously dosed in proportion to the reintegrated water flow so that the aforesaid aqueous solution is present in the reservoir. Alternatively, the dosage can be defined based on specific parameters monitored by means of probes or other suitable analytical methods, such as for example pH, redox potential, conductivity, TOC or ATP, or controlled temporally by using special timers.

According to a second embodiment, during said method, said aqueous solution is sprayed or nebulized on the product to be sanitized. According to this embodiment, the aqueous formulation is dosed in the water to be sprayed or nebulized so that the aforesaid aqueous solution is sprayed or nebulized on the products to be sanitized.

This embodiment advantageously also allows sanitizing the washing water or the spraying or nebulizing system of the aqueous solution.

In the following description, some examples of products subjected to said sanitization method are described, by way of non-limiting example, the method comprising said cleansing step and possibly a subsequent disinfection step as described above.

1) Agri-Food Products

According to an embodiment, said product is an agri-food or agricultural product, for example selected from fruit and vegetables intended for the IV range, or agricultural products intended for more complex processing in dedicated industrial transformation and processing plants.

In a first embodiment, said agri-food or agricultural products are subjected to treatment or washing by dipping in special tanks, and the aqueous formulation is preferably dosed continuously in the water feeding said tanks, in proportion to the flow rate of the feed water, or according to the other modes described above.

In a second embodiment, said agri-food or agricultural products are subjected to washing or rinsing by spraying or nebulization, as described above.

The aqueous solution with which said agri-food or agricultural products are treated or washed comprises:

- said at least one biosurfactant in an amount preferably between 0.0001 and 0.5% by weight, for example between 0.001 and 0.1% by weight,
- said at least one organic acid in an amount preferably between 0.001 and 1% by weight, for example between 0.01 and 0.1% by weight,
- optionally said at least one non-oxidizing disinfectant agent in an amount preferably between 0.0001 and 0.1% by weight, for example between 0.0001 and 0.05% by weight or between 0.001 and 0.01% by weight, and
- optionally said at least one essential oil or plant extract in an amount between 0.001 and 0.1% by weight.

Preferably, said aqueous solution does not contain enzymes. Preferably, said aqueous solution does not contain synthesis surfactants. Preferably, said aqueous solution does not contain chelating agents.

Said sanitization method of the invention has proved to be particularly effective in ensuring adequate microbiological conditions of agricultural products and making the products safer for the final consumer, eliminating the risk of the onset of diseases caused by foodborne pathogens such as enteropathogenic *Salmonella* spp, *Listeria monocytogenes, Escherichia coli*. It has also been found that the sanitization method of the invention allows improving the organoleptic qualities and increasing the shelf-life of the products by virtue of the reduction of deterioration phenomena caused by microorganisms, resulting in the reduction of food waste. Furthermore, the biodegradability and biocompatibility of the formulations cause any residues present on the treated products not only not to be a risk to the health of the consumer, but rather to contribute to increasing the quality and shelf-life thereof.

2) Medical-Surgical Instruments

According to an embodiment, said product is a medical-surgical instrument, for example selected from medical devices used for invasive and non-invasive, therapeutic or diagnostic practices, such as for example endoscopes and surgical instruments.

The aqueous solution with which said products are treated or sanitized comprises:

- said at least one biosurfactant in an amount preferably between 0.1 and 10% by weight, for example between 0.5 and 2% by weight, said at least one organic acid in an amount preferably between 0.01 and 10% by weight, for example between 0.1 and 10% by weight or between 0.5% and 2% by weight, optionally said at least one synthesis surfactant in an amount preferably between 0.01 and 10% by weight, for example between 0.1 and 10% by weight or between 0.1% and 1% by weight, optionally said at least one enzyme in an amount between 0.00001 and 2% by weight, for example between 0.001 and 1% by weight, optionally said at least one non-oxidizing disinfectant agent in an amount preferably between 0.001 and 1% by weight, for example between 0.01 and 1% by weight, optionally said at least one essential oil or plant extract in an amount between 0.001 and 0.1% by weight, and optionally said at least one chelating agent in an amount between 0.0001 and 0.1% by weight, preferably between 0.001 and 0.1% by weight.

3) Surfaces and Equipment for the Processing and Packaging of Food and Agri-Food Products According to an embodiment, the sanitization method of the invention is used for operations of sanitizing the surfaces and equipment of processing and packaging plants for food and agri-food products.

In this embodiment, the formulation is preferably added to the washing water used for cleaning said surfaces and equipment, obtaining the aqueous solution in accordance with the description above. Preferably, the aqueous solution with which said surfaces and equipment are sanitized is the same, or substantially the same, as that used for sanitizing medical-surgical instruments in accordance with the description above.

Experimental Section

1) Dental Units

Two dental units, hereinafter identified as "unit A" and "unit B", respectively, were subjected to a method of treatment according to an embodiment of the present invention. In particular, two interventions were carried out, hereinafter identified as "Intervention N. 1" and "Intervention N. 2", respectively, on units A and B 30 days apart.

Interventions were further carried out on a dental unit identified as "unit C" and on a dental unit identified as "unit D" by using, respectively, a method according to the present invention and a method outside the scope of the present invention. The intervention carried out on unit C is identified as "Intervention 3A" and the intervention carried out on unit D is identified as "Intervention 3B".

Intervention N.1

The units A and B were subjected to a sanitization method according to the invention carried out according to a discontinuous mode (shock treatment), comprising:

a first cleansing step using a solution ("Solution 1") in demineralized water comprising: 1% by weight of a sophorolipid, 2% by weight of citric acid, and 0.003% by weight of mint essential oil;

a second disinfection step using a solution ("Solution 2") comprising 0.5% by weight of hydrogen peroxide in demineralized water.

Solution 1 is the aqueous solution circulating in the water circuit of the dental units during the cleansing step. Solution 2 is the aqueous solution circulating in the water circuit of the dental units during the subsequent disinfection step.

Pre-Intervention Sampling

An absolute filter was installed on the pipe, at the input point of the water circuit of each unit, in order to eliminate the risk associated with any microbiological contamination from the main network of the building.

A flushing was then performed, followed by a sampling from the cup and all the water handpieces. A total of 1.5 liters of sample were collected for ATP analysis, collecting the same amount from all the outlets, in order to have a representative sample of the overall microbiological state of the dental unit.

Cleansing Step with Solution 1

The water circuit of each dental unit was conditioned with Solution 1. A total of 1.5 liters of Solution 1 were used for the operation (for each dental unit). The presence of the solution at each outlet of the unit was confirmed by monitoring the pH with specific color change indicators (the circulating aqueous solution has pH=2). Solution 1 was left on for 60'.

At the end of the exposure time, an abundant rinse was carried out. The absence of solution residues at each outlet was confirmed by verifying the restoration of pH neutrality.

The samples were then collected (so-called "post-cleansing samples").

Disinfection Step with Solution 2

About 2 liters of Solution 2 were used for the next disinfection step. The presence of the disinfectant agent at each outlet of the two units was confirmed by using appropriate strips for the detection of peroxides. Once the water circuit of each unit was completely filled, Solution 2 was left on for about 30'.

At the end of the exposure time, the circuit was thoroughly rinsed by flushing from all the outlets, checking the complete removal of the disinfectant agent with appropriate strips.

The samples were then collected (so-called "post-disinfection samples").

Microbiological Monitoring (ATP Analysis)

The evolution of the microbiological state of the dental units A and B was monitored in real time during the intervention by performing an ATP analysis by bioluminescence. This analysis was carried out using 100 ml of sample, previously subjected to filtration in order to eliminate any free environmental ATP. Tables 1 and 2 show the values of ATP (pg cATP/ml) measured in the different steps, for each of the two units:

TABLE 1

| UNIT A | |
|---|---|
| Sample | pg cATP/ml |
| Pre-intervention sample | 28.5 |
| Post-cleansing sample | 0.3 |
| Post-disinfection sample | 0.1 |

TABLE 2

| UNIT B | |
|---|---|
| Sample | pg cATP/ml |
| Pre-intervention sample | 29.0 |
| Post-cleansing sample | 0.8 |
| Post-disinfection sample | 0.2 |

The pre-intervention sampling highlighted the presence of a high ATP value in both units, indicative of a microbiological condition of the water which is unsuitable for the type of water and the use made thereof. In both cases, already following the cleansing step alone, the level of ATP found was reduced by 98-99% with respect to the initial condition. With the subsequent disinfection step, it was possible to achieve an ATP value even less than 0.5 pg cATP/ml, which is normally recommended for this type of water.

Intervention N. 2

Following a 30-day shutdown of the units A and B, a sanitization method was carried out in a discontinuous mode (shock treatment), comprising:

- a first cleansing step using a solution ("Solution 3") in demineralized water comprising: 1% by weight of a sophorolipid, 2% by weight of citric acid, and 0.003% by weight of eucalyptus essential oil;
- a second disinfection step using a solution ("Solution 4") comprising 1.0% by weight of hydrogen peroxide in demineralized water.

Solution 3 is the aqueous solution circulating in the water circuit of the dental units during the cleansing step. Solution 4 is the aqueous solution circulating in the water circuit of the dental units during the subsequent disinfection step.

Pre-Intervention Sampling

Before starting the operations, the antibacterial filter installed before the execution of the previously described intervention was replaced in each dental unit.

The samples were then collected, collecting the same amount of water from all the outlets, for the analysis of the ATP and the determination of the bacterial count with dipslides.

Cleansing Step with Solution 3

The water circuit of each dental unit was conditioned with Solution 3. A total of 1.5 liters of Solution 3 were used for the operation (for each dental unit). The presence of the solution at each outlet of the unit was confirmed by monitoring the pH with specific color change indicators (the circulating aqueous solution has pH=2). Solution 3 was left on for 60'.

At the end of the exposure time, an abundant rinse was carried out. The absence of solution residues at each outlet was confirmed by verifying the restoration of pH neutrality.

The samples were then collected (so-called "post-cleansing samples") for the ATP analysis and the determination of bacterial count with dipslides.

Disinfection Step with Solution 4

About 1 liter of Solution 4 was used for the next disinfection step. The presence of the disinfectant agent at each outlet of the two units was confirmed by using appropriate strips for the detection of peroxides. Once the water circuit of each unit was completely filled, Solution 4 was left on for about 30'.

At the end of the exposure time, the circuit was thoroughly rinsed by flushing from all the outlets, checking the complete removal of the disinfectant agent with appropriate strips.

The samples were then collected (so-called "post-disinfection samples") for the ATP analysis and the determination of bacterial count with dipslides.

Microbiological Monitoring (ATP Analysis)

The evolution of the microbiological state of the dental units A and B was monitored in real time during the intervention by performing an ATP analysis by bioluminescence. This analysis was carried out using 100 ml of sample, previously subjected to filtration in order to eliminate any free environmental ATP. Tables 3 and 4 show the values of ATP (pg cATP/ml) measured in the different steps, for each of the two units:

TABLE 3

| UNIT A | |
|---|---|
| Sample | pg cATP/ml |
| Pre-intervention sample | 65.3 |
| Post-cleansing sample | 2.1 |
| Post-disinfection sample | 0.4 |

TABLE 4

| UNIT B | |
|---|---|
| Sample | pg cATP/ml |
| Pre-intervention sample | 39.4 |
| Post-cleansing sample | 3.3 |
| Post-disinfection sample | 0.3 |

As can be seen from the results in the table, the ATP value detected before performing the intervention is higher than that found in the previous intervention. This is due to the long 30-day shutdown of the two units: it is known that periods of water stagnation contribute to microbial proliferation and the formation of biofilms.

In both units A and B, already following the cleansing step alone, the level of ATP found was reduced by about 95% with respect to the initial condition.

With the subsequent disinfection step, it was possible to achieve an ATP value even less than 0.5 pg cATP/ml, which is normally recommended for this type of water.

The total bacterial count values determined by dipslides (incubated at 30° C. for 48 h) are consistent with the outcome of the monitoring performed by ATP-metry, as is apparent from the images in FIG. 1.

Interventions N. 3A and 3B

Unit C was subjected to a sanitization method according to the invention carried out in a discontinuous mode (shock treatment), comprising a cleansing step using a solution ("Solution 5") in demineralized water comprising: 2% by weight of a sophorolipid, 1% by weight of citric acid, 1% by weight of alkylpolyglucoside and 0.003% by weight of mint essential oil.

Unit D was subjected to a sanitization method outside the scope of the present invention carried out in a discontinuous mode (shock treatment), comprising a cleansing step using a solution ("Solution 6") in demineralized water comprising: 0.001% by weight of a sophorolipid, 0.0005% by weight of citric acid, 0.005% by weight of alkylpolyglucoside and 0.003% by weight of mint essential oil.

Pre-Intervention Sampling

An absolute filter was installed on the pipe, at the input point of the water circuit of each unit, in order to eliminate the risk associated with any microbiological contamination from the main network of the building.

A flushing was then performed, followed by a sampling from the cup and all the water handpieces. A total of 1.5 liters of sample were collected for ATP analysis, collecting the same amount from all the outlets, in order to have a representative sample of the overall microbiological state of the dental unit.

The flow of water delivered by the air/water syringe was checked as well, as an indicator of the obstruction state of the internal circuits. Under normal operating conditions, such an instrument delivers a flow of water equal to 100 ml/min.

Cleansing Step with Solutions 5 and 6

The water circuit of units C and D was conditioned with Solutions 5 and 6, respectively. A total of 1.5 liters of Solution 5 or 6 were used for the operation (for each unit). The presence of the solution at each outlet of the unit was confirmed by monitoring the pH with specific color change indicators (the circulating aqueous solution has pH=2). The solutions were left on for 60'.

At the end of the exposure time, an abundant rinse was carried out. The absence of solution residues at each outlet was confirmed by verifying the restoration of pH neutrality.

The samples were then collected (so-called "post-cleansing samples") and the flow of water from the air-water syringe was checked.

Results of the Monitoring (ATP Analysis, Flow Check)

The evolution of the microbiological state of the dental units C and D was monitored in real time during the intervention by performing an ATP analysis by bioluminescence. This analysis was carried out using 100 ml of sample, previously subjected to filtration in order to eliminate any free environmental ATP. Tables 5 and 6 show the values of ATP (pg cATP/ml) and of the water flow measured from the air/water syringe (ml/min) for each of the two units:

TABLE 5

| UNIT C | | |
|---|---|---|
| Sample | pg cATP/ml | Flow ml/min |
| Pre-intervention sample | 50.1 | 55 |
| Post-cleansing sample with Solution 5 | 0.2 | 99 |

TABLE 6

| UNIT D | | |
|---|---|---|
| Sample | pg cATP/ml | Flow ml/min |
| Pre-intervention sample | 48.6 | 60 |
| Post-cleansing sample with Solution 6 | 42.2 | 58 |
| Post-cleansing sample with Solution 5 | 0.3 | 100 |

The pre-intervention sampling highlighted the presence of a high ATP value in both units, indicative of a microbiological condition of the water which is unsuitable for the type of water and the use made thereof. Furthermore, the check of the flow of water from the air/water syringe showed a reduction thereof as compared to normal operating conditions, as a consequence of the presence of limestone deposits and biofilm inside the circuits.

In the case of unit C, treated with Solution 5, following the cleansing step, the level of ATP found was reduced by more than 99% as compared to the initial condition, and the water flow from the air/water syringe was correctly restored, demonstrating the removal of deposits present in the circuits.

Conversely, in the case of unit D, following treatment with Solution 6, no appreciable improvement was obtained in either the ATP value or the water flow exiting from the air/water syringe. Only after treatment with Solution 5, it was possible to obtain a reduction in the ATP value and a restoration of the correct flow of water exiting from the air/water syringe.

2) Public Drinking Water Supply System

A public drinking water supply system was subjected to a method of treatment according to an embodiment of the invention according to a discontinuous mode (shock treatment), comprising:

- a first cleansing step comprising dosing in water, by means of a dosing pump, a concentrated formulation comprising 20% by weight of a sophorolipid and 25% by weight of citric acid. Such a formulation was dosed in a manner proportional to the flow rate of the feed water of the supply system, so as to obtain inside the circuits thereof a solution ("Solution 7") comprising 2% by weight of a sophorolipid and 2.5% by weight of citric acid;
- a second disinfection step comprising dosing in water, by means of a dosing pump, a disinfectant agent comprising 10% by weight of hydrogen peroxide and 0.5% by weight of peracetic acid. Such a formulation was dosed proportionally to the flow rate of the feed water of the supply system, so as to obtain inside the circuits thereof a solution ("Solution 8") comprising 1% by weight of hydrogen peroxide and 0.05% by weight of peracetic acid.

The concentrated formulation and the disinfectant agent were dosed inside the pipe which selectively feeds the drinking water supply system, at a dosing point placed in correspondence of the separation of the pipe itself from the main aqueduct road line.

Pre-Intervention Sampling

Before performing the intervention, a flushing was carried out, then a sampling, for performing microbiological analyses from all the sampling points of the system, representative of the different steps to which the water is subjected from the entry into the system to the supply point, arranged as detailed below:

Point 1: sampling point upstream of the inlet mechanical filter;

Point 2: sampling point downstream of the mechanical filter and upstream of the UV lamps;

Point 3: sampling point downstream of the UV lamps and upstream of the absolute filter (0.2 μm);

Step 4: sampling point downstream of the absolute filter (0.2 μm);

Step 5: dispenser.

Cleansing Step with Solution 7

The circuit feeding the supply system and the internal hydraulic components thereof were conditioned with Solution 7. The presence of the solution at each flushable point was confirmed by monitoring the pH with specific color change indicators (the circulating aqueous solution has pH=2). Solution 7 was left on for 60'.

At the end of the exposure time, an abundant rinse was carried out. The absence of solution residues at each flushable point was confirmed by verifying the restoration of pH neutrality.

The samples were then collected (so-called "post-cleansing samples").

Disinfection Step with Solution 8

The subsequent disinfection step was carried out similarly to the cleansing step, with the only difference that this step required the use of Solution 8. The presence of the disinfectant agent at all the flushable points of the system was confirmed by using appropriate strips for the detection of peroxides. Once the circuit was completely filled, Solution 8 was left on for about 30'.

At the end of the exposure time, the circuit was thoroughly rinsed by flushing from all the flushable points, checking the complete removal of the disinfectant agent with appropriate strips.

The samples were then collected (so-called "post-disinfection samples").

Microbiological Monitoring (ATP Analysis)

The evolution of the microbiological state of the circuit of the drinking water supply system was monitored in real time during the intervention by performing an ATP analysis by bioluminescence. This analysis was carried out using 100 ml of sample, previously subjected to filtration in order to eliminate any free environmental ATP. Table 7 shows the ATP values (pg cATP/ml) detected in the different steps, at each of the control points. An analysis with culture method of the total bacterial count at 22° C. and 37° C. and of *P. aeruginosa* was also performed on the same points. The results of such analyses are summarized in Table 8.

TABLE 7

ATP Monitoring

| Sample | Pre-intervention (pg cATP/ml) | Post-cleansing (pg cATP/ml) | Post-disinfection (pg cATP/ml) |
|---|---|---|---|
| Point 1 | 10.0 | 0.5 | 0.3 |
| Point 2 | 21.5 | 0.7 | 0.1 |
| Point 3 | 4.5 | 0.2 | 0.1 |
| Point 4 | 0.5 | 0.1 | 0.1 |
| Point 5 | 2.3 | 0.1 | 0.1 |

TABLE 8

Microbiological parameters monitoring

| Sample | Step | CBT 22° C. (UFC/ml) | CBT 37° C. (UFC/ml) | *P. aeruginosa* (UFC/250 ml) |
|---|---|---|---|---|
| Point 1 | Pre-intervention | 230 | 80 | 56 |
| | Post-cleansing | 10 | 4 | 3 |
| | Post-disinfection | 3 | 2 | <1 |
| Point 2 | Pre-intervention | 300 | 91 | 64 |
| | Post-cleansing | 11 | 3 | 3 |
| | Post-disinfection | 4 | <1 | <1 |
| Point 3 | Pre-intervention | 26 | 12 | 10 |
| | Post-cleansing | 5 | 2 | <1 |
| | Post-disinfection | 3 | <1 | <1 |
| Point 4 | Pre-intervention | 16 | 5 | 3 |
| | Post-cleansing | 3 | 2 | <1 |
| | Post-disinfection | <1 | <1 | <1 |
| Point 5 | Pre-intervention | 56 | 27 | >100 |
| | Post-cleansing | 9 | 5 | <1 |
| | Post-disinfection | 3 | <1 | <1 |

The pre-intervention sampling highlighted the presence of an unsuitable microbiological condition, in particular at points 1, 2 and 5: the condition of the first two points is justifiable considering the presence of a slight contamination of the feed water, triggering a bacterial proliferation at the mechanical filter, with probable formation of biofilms inside the circuit (favored by the presence of *P. aeruginosa*, a highly biofilmogenic bacterial species). The presence of biofilms justifies the fact that the UV lamp, while reducing microbial contamination, is still not enough to break it down completely. A retro-contamination phenomenon is instead responsible for the charges observed at the dispensing point. This retro-contamination was extended backwards along the circuit, as demonstrated by the limited, but present, charge detected downstream of the 0.2 μm absolute filter.

Already following the cleansing step, all the parameters analyzed show a significant improvement in the microbiological quality of the internal surfaces of the plant. In particular, the reduction of the *P. aeruginosa* charges confirms an effective removal of the biofilm. With the subsequent disinfection step, it was possible to restore an adequate microbiological condition with respect to all the parameters considered and at all the control points included in the monitoring.

3) Hydroponic Cultivation Plant

A distribution system of a fertigation solution of a hydroponic cultivation plant was subjected to a method of treatment according to an embodiment of the invention according to a discontinuous mode (shock treatment), comprising:

a first cleansing step using an aqueous solution ("Solution 9") comprising: 1% by weight of a sophorolipid, 1% by weight of citric acid and 0.05% by weight of L-glutamic N,N-diacetic acid tetrasodium salt;

a second disinfection step using an aqueous solution ("Solution 10") comprising: 0.5% by weight of hydrogen peroxide and 0.005% by weight of peracetic acid.

Solution 9 is the aqueous solution circulating in the water circuit of the hydroponic cultivation plant during the cleansing step. Solution 10 is the aqueous disinfectant solution circulating in the water circuit of the hydroponic cultivation plant during the subsequent disinfection step. Both solutions were prepared in the tank which feeds the circuit and from here conveyed to the entire circuit.

Pre-Intervention Sampling

Before carrying out the intervention, a check was performed of the obstruction state of the 50 nozzles which deliver the fertigation solution into the growth substrate of the crops. 10% thereof were almost completely blocked.

Furthermore, some nozzles were selected, from each of which a 100 ml sample was collected to perform the ATP analysis.

Cleansing Step with Solution 9

The water circuit was conditioned with Solution 9. The presence of the solution at the nozzles was confirmed by monitoring the pH with specific color change indicators (the circulating aqueous solution has pH=2). Solution 9 was left on for 60'.

At the end of the exposure time, an abundant rinse was carried out. The absence of solution residues at each nozzle was confirmed by verifying the restoration of pH neutrality.

The samples were then collected from the selected nozzles (so-called "post-cleansing samples").

Disinfection Step with Solution 10

The disinfection step was then carried out. The presence of the disinfectant agent at the nozzles was confirmed by using appropriate strips for the detection of peroxides. Once the circuit was completely filled, Solution 10 was left on for about 30'.

At the end of the exposure time, the circuit was rinsed by flushing, checking the removal of the disinfectant agent with appropriate strips.

The samples were then collected (so-called "post-disinfection samples").

Microbiological Monitoring (ATP Analysis)

The evolution of the microbiological state was monitored in real time during the intervention by performing an ATP analysis by bioluminescence. This analysis was carried out using 100 ml of sample, previously subjected to filtration in order to eliminate any free environmental ATP. Table 9 shows the ATP values (pg cATP/ml) detected in the different steps:

TABLE 9

| Sample | ATP values (pg cATP/ml) | | |
|---|---|---|---|
| | Pre-intervention | Post-cleansing | Post-disinfection |
| Nozzle 1 | 90.2 | 2.6 | 0.2 |
| Nozzle 8 | 87.1 | 2.5 | 0.2 |
| Nozzle 13 | 99.8 | 2.8 | 0.2 |
| Nozzle 21 | 103.5 | 3.0 | 0.2 |
| Nozzle 30 | 105.7 | 3.3 | 0.3 |
| Nozzle 38 | 101.2 | 4.1 | 0.4 |
| Nozzle 42 | 123.4 | 3.5 | 0.3 |
| Nozzle 50 | 136.6 | 4.6 | 0.4 |

The pre-intervention sampling highlighted the presence of high ATP values, indicative of the presence of biofilms and consequent microbial proliferation inside the circuit. The cleansing step allowed obtaining a reduction of the levels of ATP equal to 98-99% with respect to the initial condition, and allowed eliminating the obstructions present in the circuit and in the nozzles, restoring the correct flow at the level thereof. With the subsequent disinfection step, it was possible to achieve an ATP value well below 1 pg cATP/ml, as normally recommended for drinking water.

It is apparent that those which have been described are only particular embodiments of the present invention. Those skilled in the art will be able to make all the necessary modifications to the method of the present invention for the adaptation thereof to particular conditions, without however departing from the scope of protection as defined in the appended claims.

The invention claimed is:

1. A method of treating at least one surface, comprising a step in which said at least one surface is contacted with an aqueous solution obtained by mixing in water an aqueous formulation comprising at least one biosurfactant and at least one organic acid, wherein the weight ratio between said at least one biosurfactant and said at least one organic acid is between 1:1000 and 10:1, in an amount such that said aqueous solution comprises said at least one biosurfactant in an amount between 0.0001 and 10% by weight and said at least one organic acid in an amount between 0.001 and 10% by weight;

said at least one biosurfactant being selected from glycolipids, lipopeptides, lipoproteins, phospholipids and polymeric biosurfactants, from the group consisting of sophorolipids, rhamnolipids, trehalolipids, cellobiose lipids, surfactin, viscosin, lichenysin, iturin, fengycin, emulsan, biodispersan, alasan, liposan;

said at least one organic acid being selected from citric acid, lactic acid, acetic acid, malic acid, maleic acid, formic acid, caprylic acid, methanesulfonic acid, tartaric acid, succinic acid, and polyaspartic acid;

wherein said at least one surface is the internal surface of a plant fed with water from a water distribution system;

wherein said method comprises a step of preventing formation of biofilm on said internal surface or of disintegrating the biofilm present on said internal surface, said step being a cleansing step;

wherein said cleansing step comprises circulating said aqueous solution inside the plant, in contact with said at least one surface; and wherein said plant is an open system, wherein water coming from said water distribution system flow through the plant and then flows out from the plane without recirculating inside the plant.

2. A method according to claim 1, wherein said aqueous solution is obtained by mixing in water said aqueous formulation, further comprising one or more of:

at least one synthesis surfactant of anionic, cationic, amphoteric or non-ionic nature, deriving from a renewable source, wherein the weight ratio between said at least one biosurfactant and said at least one synthesis surfactant is between 1:1 and 1:0.01;

at least one enzyme which is active at acidic or neutral pH, wherein the weight ratio between said at least one biosurfactant and said at least one enzyme is between 1:0.0001 and 1:0.1, said at least one enzyme being selected from the group consisting of enzymes for the degradation of polysaccharides, enzymes for the degradation of proteins, lipases, nucleases, and enzymes adapted to catalyze redox reactions;

at least one non-oxidizing disinfectant agent, wherein the weight ratio between said at least one biosurfactant and said at least one non-oxidizing disinfectant agent is between 1:0.0001 and 1:0.1, said at least one non-oxidizing disinfectant agent being selected from quaternary ammonium salts, alcohols and biguanide compounds;

at least one essential oil or plant extract, wherein the weight ratio between said at least one biosurfactant and said at least one essential oil or plant extract is between 1:0.0001 and 1:0.01;

at least one chelating agent, biodegradable, bio-based, obtained from renewable sources, wherein the weight ratio between said at least one biosurfactant and said at least one chelating agent is between 1:0.0001 and 1:0.1, said at least one chelating agent being selected from glutamic N,N-diacetic acid (GLDA) and salts thereof, chitosan, methylglycine N,N-diacetic acid (MGDA) and salts thereof, ethylenediamine-N,N-disuccinic acid (EDDS), polyaspartic acid and salts thereof, gluconic acid and salts thereof, said aqueous formulation being mixed in water in an amount such that:

said at least one synthesis surfactant is comprised in said aqueous solution in an amount between 0.001 and 10% by weight; and/or said at least one enzyme is comprised in said aqueous solution in an amount between 0.00001 and 2% by weight; and/or said at least one non-oxidizing disinfectant agent is comprised in said aqueous solution in an amount between 0.0001 and 1% by weight; and/or said at least one essential oil or plant extract is comprised in said aqueous solution in an amount between 0.001 and 0.1% by weight; and/or said at least one chelating agent is comprised in said aqueous solution in an amount between 0.0001 and 0.1% by weight.

3. A method according to claim 1, said method being carried out continuously, wherein said aqueous solution circulating inside the plant comprises:

said at least one biosurfactant in an amount between 0.0001 and 0.5% by weight; and said at least one organic acid in an amount between 0.001 and 1% by weight.

4. A method according to claim 3, wherein said aqueous solution circulating inside the plant is obtained by mixing in water said aqueous formulation further comprising one or more of:

at least one synthesis surfactant of anionic, cationic, amphoteric or non-ionic nature, deriving from a renewable source, wherein the weight ratio between said at least one biosurfactant and said at least one synthesis surfactant is between 1:1 and 1:0.01;

at least one non-oxidizing disinfectant agent, wherein the weight ratio between said at least one biosurfactant and said at least one non-oxidizing disinfectant agent is between 1:0.0001 and 1:0.1, said at least one non-oxidizing disinfectant agent being selected from quaternary ammonium salts, alcohols and biguanide compounds;

at least one essential oil or plant extract, wherein the weight ratio between said at least one biosurfactant and said at least one essential oil or plant extract is between 1:0.0001 and 1:0.01;

said aqueous formulation being mixed in water in an amount such that:

said at least one synthesis surfactant is comprised in said aqueous solution in an amount between 0.001 and 0.1% by weight; and/or said at least one non-oxidizing disinfectant agent is comprised in said aqueous solution in an amount between 0.0001 and 0.1% by weight, and/or said at least one essential oil or plant extract is comprised in said aqueous solution in an amount between 0.001 and 0.1% by weight.

5. A method according to claim 3, comprising a sequence of cleansing steps alternating with disinfection steps, wherein each of said disinfection steps comprises mixing a disinfectant agent in water in an amount to obtain an aqueous disinfectant solution circulating inside the plant which comprises said disinfectant agent in an amount between 0.001 and 1.5% by weight, said aqueous disinfectant solution comprising between 0.01 and 1% by weight of hydrogen peroxide and/or between 0.001 and 0.5% by weight of peracetic acid.

6. A method according to claim 1, said method being carried out according to a discontinuous mode, wherein said aqueous solution circulating inside the plant comprises:

said at least one biosurfactant in an amount between 0.1 and 10% by weight; and said at least one organic acid in an amount between 0.01 and 10% by weight.

7. A method according to claim 6, wherein said aqueous solution circulating inside the plant is obtained by mixing in water said aqueous formulation further comprising one or more of:

at least one synthesis surfactant of anionic, cationic, amphoteric or non-ionic nature, deriving from a renewable source, wherein the weight ratio between said at least one biosurfactant and said at least one synthesis surfactant is between 1:1 and 1:0.01;

at least one enzyme which is active at acidic or neutral pH, wherein the weight ratio between said at least one biosurfactant and said at least one enzyme is between 1:0.0001 and 1:0.1, said at least one enzyme being selected from the group consisting of enzymes for the degradation of polysaccharides, enzymes for the degradation of proteins, lipases, nucleases, and enzymes adapted to catalyze redox reactions;

at least one non-oxidizing disinfectant agent, wherein the weight ratio between said at least one biosurfactant and said at least one non-oxidizing disinfectant agent is between 1:0.0001 and 1:0.1, said at least one non-oxidizing disinfectant agent being selected from quaternary ammonium salts, alcohols and biguanide compounds;

at least one essential oil or plant extract, wherein the weight ratio between said at least one biosurfactant and said at least one essential oil or plant extract is between 1:0.0001 and 1:0.01;

at least one chelating agent, said at least one chelating agent being biodegradable, bio-based, obtained from renewable sources, wherein the weight ratio between said at least one biosurfactant and said at least one chelating agent is between 1:0.0001 and 1:0.1, said at least one chelating agent being selected from glutamic N,N-diacetic acid (GLDA) and salts thereof, chitosan, methylglycine N,N-diacetic acid (MGDA) and salts thereof, ethylenediamine-N,N-disuccinic acid (EDDS), polyaspartic acid and salts thereof, gluconic acid and salts thereof;

said aqueous formulation being mixed in water in an amount such that:

said at least one synthesis surfactant is comprised in said aqueous solution in an amount between 0.01 and 10% by weight; and/or said at least one enzyme is comprised in said aqueous solution in an amount between 0.00001 and 2% by weight; and/or said at least one non-oxidizing disinfectant agent is comprised in said aqueous solution in an amount between 0.01 and 1% by weight; and/or said at least one essential oil or plant extract is comprised in said aqueous solution in an amount between 0.001 and 0.1% by weight; and/or said at least one chelating agent is comprised in said aqueous solution in an amount between 0.0001 and 0.1% by weight.

8. A method according to claim 6, wherein said plant is a drinking or mineral water supply system, and said water distribution system includes a tank or the aqueduct distribution network or a water source.

9. A method according to claim 1, wherein said water distribution system includes an aqueduct distribution network or a well or a water source or a water storage tank, said water distribution system further comprising at least one pipe configured to selectively feed the plant with water from said aqueduct distribution network or said well or said water source or said tank;

said aqueous formulation being dosed into said tank or into said at least one pipe configured to selectively feed the plant, at the beginning of said at least one pipe configured to selectively feed the plant.

10. A method according to claim 1, wherein said plant is a water distribution plant for an end use and said aqueous formulation is dosed in the water for said end use;

wherein said plant is a field irrigation system or a vertical cultivation plant or a hydroponic cultivation plant, and said water distribution system includes a well or an aqueduct distribution network or a water storage tank.

11. A method according to claim 1, wherein said plant is a water circuit of dental units, and said water distribution system includes a tank or an internal water distribution network inside the building where one of the dental units is located.

12. A method according to claim 1, comprising a step of disinfection of said at least one surface, said disinfection step being after the step in which said at least one surface is contacted with said aqueous solution;

wherein said disinfection step comprises mixing in water a disinfectant agent in an amount to obtain an aqueous disinfectant solution comprising said disinfectant agent in an amount between 0.001 and 1.5% by weight, said aqueous disinfectant solution comprising between 0.01 and 1% by weight of hydrogen peroxide and/or between 0.001 and 0.5% by weight of peracetic acid;

wherein during said disinfection step, said at least one surface is contacted with said aqueous disinfectant solution.

* * * * *